US012582931B2

(12) United States Patent
Jensen

(10) Patent No.: US 12,582,931 B2
(45) Date of Patent: Mar. 24, 2026

(54) DRYING OF FILTER ELEMENTS IN A FILTER SYSTEM

(71) Applicant: SIMATEK A/S, Sorø (DK)

(72) Inventor: Arne Grønbæk Jensen, St. Fuglede (DK)

(73) Assignee: SIMATEK A/S, Sorø (DK)

( * ) Notice: Subject to any disclaimer, the term of this patent is extended or adjusted under 35 U.S.C. 154(b) by 330 days.

(21) Appl. No.: 18/267,388

(22) PCT Filed: Dec. 17, 2021

(86) PCT No.: PCT/EP2021/086392
    § 371 (c)(1),
    (2) Date: Jun. 14, 2023

(87) PCT Pub. No.: WO2022/129466
    PCT Pub. Date: Jun. 23, 2022

(65) Prior Publication Data
    US 2024/0058733 A1     Feb. 22, 2024

(30) Foreign Application Priority Data
    Dec. 18, 2020     (DK) ............................. PA202070852

(51) Int. Cl.
    B01D 46/02         (2006.01)
    B01D 46/00         (2022.01)
    (Continued)

(52) U.S. Cl.
    CPC ......... B01D 46/0042 (2013.01); B01D 46/02 (2013.01); B01D 46/04 (2013.01);
    (Continued)

(58) Field of Classification Search
    CPC ........ B01D 46/02; B01D 46/04; B01D 46/56; B01D 46/58; B01D 46/79
    See application file for complete search history.

(56) References Cited

U.S. PATENT DOCUMENTS 5,766,281 A     6/1998   Luy et al.
6,149,716 A     11/2000  Bach et al.
                (Continued)

FOREIGN PATENT DOCUMENTS

CN     211676754 U    10/2020
DE     44 43 632 A1    6/1996
                (Continued)

OTHER PUBLICATIONS

Office Action dated Jun. 17, 2021 from Danish priority Application PA 2020 70852 (8 pages).
                (Continued)

*Primary Examiner* — Robert A Hopkins
(74) *Attorney, Agent, or Firm* — Crowell & Moring LLP; Trevor K. Copeland

(57) ABSTRACT

A filter system including a filter housing with an inlet part, a clean-gas outlet, and a partition wall defining a product chamber and a clean-gas chamber. The partition wall having openings from which filter elements extend downward into the product chamber. The inlet part is placed in an upper part of the product chamber and configured for supplying a product-containing flow of gas to the product chamber. The gas flow being conveyed through the filter elements and into the clean-gas chamber, where the filter system is provided with an air or gas supply placed in the product chamber and configured for leading drying air or gas into or out of the filter system.

A method of drying filter elements in a filter system by passing drying air or gas through a filter inlet and/or through a drying air or gas supply.

10 Claims, 6 Drawing Sheets

(51) Int. Cl.

|   |   |
|---|---|
| *B01D 46/04* | (2006.01) |
| *B01D 46/56* | (2022.01) |
| *B01D 46/58* | (2022.01) |
| *B01D 46/79* | (2022.01) |

(52) U.S. Cl.

CPC ............. *B01D 46/56* (2022.01); *B01D 46/58* (2022.01); *B01D 46/79* (2022.01)

(56) References Cited

U.S. PATENT DOCUMENTS

| 6,676,720 B1 | 1/2004 | Simonsen et al. |
|---|---|---|
| 2010/0083835 A1 | 4/2010 | Nowak et al. |
| 2010/0101737 A1 | 4/2010 | Kiekens et al. |

FOREIGN PATENT DOCUMENTS

| DE | 102 45 734 A1 | 4/2004 | |
|---|---|---|---|
| DE | 102008017631 A1 | * 11/2009 | ............. B01D 46/02 |
| EP | 0 781 587 A1 | 7/1997 | |
| JP | H03-288508 A | 12/1991 | |
| JP | 2004261766 A | * 9/2004 | |
| WO | WO 01/51172 A2 | 7/2001 | |

OTHER PUBLICATIONS

International Search Report dated Mar. 17, 2022 (4 pages) from PCT Priority Application PCT/EP2021/086392.

Written Opinion dated Mar. 17, 2022 (7 pages) from PCT Priority Application PCT/EP2021/086392.

Written Opinion (PCT Rule 66) dated Oct. 26, 2022 (5 pages) from PCT Priority Application PCT/EP2021/086392.

Response to Second Written Opinion dated Dec. 22, 2022 (6 pages).

Written Opinion (6 pages) dated Feb. 27, 2023 from PCT Priority Application PCT/EP2021/086392.

International Report on Patentability (6 pages) dated Mar. 30, 2023 from PCT Priority Application PCT/EP2021/086392.

* cited by examiner

DRYING OF FILTER ELEMENTS IN A FILTER SYSTEM

This application is a National Stage application of International Application No. PCT/EP2021/086392, filed Dec. 17, 2021, the entire contents of which are incorporated herein by reference.

This application claims priority under 35 U.S.C. § 119 (a) to Danish Patent Application No. PA 2020 70852, filed on Dec. 18, 2020, the entire contents of each of which are incorporated herein by reference.

BACKGROUND OF THE INVENTION

Field of the Invention

The invention relates to a filter system including a filter housing with an inlet part and a clean-gas outlet and further including a partition wall dividing the filter housing into a product chamber and a clean-gas chamber, the partition wall being provided with a number of openings from which a plurality of filter elements extends downwards into the product chamber, which inlet part is placed in an upper part of the product chamber and in open communication with the product chamber, and configured for supplying a product-containing flow of gas to the product chamber, the gas flow being conveyed through the filter elements and upwards into the clean-gas chamber, from where the filtered gas is discharged through the clean-gas outlet.

The invention also relates to a method of drying filter elements in a filter system.

Description of the Related Art

When cleaning filter elements in a filter housing most often CIP wet cleaning (cleaning in place) is used for cleaning of the filter system including the filter elements. After wet cleaning of the filter system including the filter elements, the filter system must be dried before it can be used again. To dry the filter system including the filter elements, drying air is passed through the filter system and filter elements in the same way as when the filter system is in operation. Heated air is used to speed-up the drying process.

An objective of the invention is to optimize drying of wet-cleaned filter elements by reducing drying time and to ensure that the elements are dry to an acceptable level/extent over the total length of the elements.

Optimizing drying of the filter system including the filter elements after wet-cleaning should be understood as reducing one or more of the parameters including temperature, drying time or air or gas flow, still ensuring that the filter elements are dry to an acceptable level/extent over the total length of the filter element.

SUMMARY OF THE INVENTION

Optimizing drying is achieved with a filter system where the filter system is provided with one or more air or gas supplies placed in the product chamber below the inlet part and configured for leading drying air or gas into or out of the filter system.

Here air or gas supplies should be understood as capable of leading air or gas into the filter system and/or to leading out air or gas from the filter system.

Filter elements can be filter bags, filter cartridges, filter envelopes or similar elements.

Hereby is achieved a more efficient drying of the filter system and filter elements as well as a significant reduction in drying time and thereby a significant reduction of downtime of a plant in which the filter system is installed, optimizing the production time of the plant.

In an embodiment, the one or more drying air or gas supplies is placed in a lower part of the filter housing and having openings placed below the filter elements.

Hereby it is possible to supply drying gas or air from both ends of a filter element, thereby optimizing the drying process, for example by shortening the drying time for the filter elements.

In an embodiment, the one or more drying air or gas supplies is placed in a lower part of the filter housing and having openings placed at a level corresponding to a lower part of the filter elements.

Hereby it is possible to supply drying gas or air from almost both ends of a filter element, thereby optimizing the drying process, for example by shortening the drying time for the filter elements.

In an embodiment, the one or more drying air or gas supplies is placed in an upper part of the filter housing and having openings directing drying air or gas towards the lower part of the filter elements.

Hereby it is possible to provide drying air or gas from an upper side of the filter housing to the outside of the filter elements.

In an embodiment the air or gas supplies directs the drying air or gas in a downwards angle towards the lower part of the filter elements.

In an alternative embodiment, the drying air or gas is directed towards the filter elements by use of baffles, guide elements or the like (not shown).

Hereby it is possible to provide a circulation of the drying air or gas between the filter elements, thereby optimizing the drying process, for example by reducing drying time.

In an embodiment, the one or more drying air or gas supplies is connected to the filter inlet passing drying air or gas through the filter inlet and through one or more drying air or gas supplies.

Hereby it is possible to provide drying air or gas from a top side of the filter housing and at the same time provide drying air or gas from another place of the filter housing.

In an embodiment an additional drying air or gas inlet and/or an air or gas inlet through a product discharge outlet supplies an additional drying air or gas to the filter system.

In an alternative embodiment, one or more drying air or gas supplies are replaced by an additional drying air or gas supply connected to a bottom of the filter housing.

In an alternative embodiment, one or more drying air or gas supplies are replaced by an additional drying air or gas supply supplied through a product discharge outlet connected to a bottom of the filter housing.

Hereby is achieved alternative solutions of supplying drying air or gas to filter elements in a filter where the size of the filter limits possibilities of placing the drying air or gas supplies to the side of the product chamber.

In an embodiment, the one or more drying air or gas supplies is placed as a combination of one or more placements mentioned in one or more of the above embodiments.

Hereby it is possible to provide different drying air or gas streams, in different directions optimizing drying of the filter elements.

In an embodiment, the one or more drying air or gas supplies is connected to the filter inlet and/or the clean-gas outlet, said one or more drying air or gas supplies being closed by closing means during normal operation and open during drying of the filter elements.

In an alternative embodiment, the one or more drying air or gas supplies is connected to the bottom of the filter housing or to the discharge outlet for removing product.

Hereby it is possible to direct the drying air or gas in a selected direction by opening or closing one or more of the drying air or gas supplies.

In an embodiment the drying air or gas or a part of the drying air or gas is directed to the further drying air or gas supplies and into the filter system.

Hereby it is possible to divide the drying air or gas stream into different directions of drying air or gas streams.

In an embodiment the drying air or gas or a part of the drying air or gas is directed through the filter inlet and into the filter system and out of the filter system through the one or more drying air or gas supplies.

Hereby it is possible to create a flow of drying air or gas passing the filter elements through the filter housing optimizing the drying process.

An objective of the invention is also achieved by a method of drying filter elements in a filter system according to any one or more of the embodiments mentioned above, where drying air or gas is supplied to the filter elements after wet cleaning of the filter elements, and where drying air or gas is passed through the filter inlet and/or through one or more drying air or gas supplies.

Hereby it is possible to provide a more optimized and efficient drying of the filter system including filter elements. This for example leads to a significant reduction in drying time and thereby a significant reduction of down-time of a plant in which the filter system is installed, optimizing the production time of the plant.

In an embodiment of the method, the drying air or gas is passed into the filter system through the filter inlet and directing at least a part of the drying air or gas out of the filter system through the one or more drying air or gas supplies.

Hereby it is possible to create a flow of drying air or gas passing the filter elements through the filter housing optimizing the drying process.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figures 1, 2, 3:
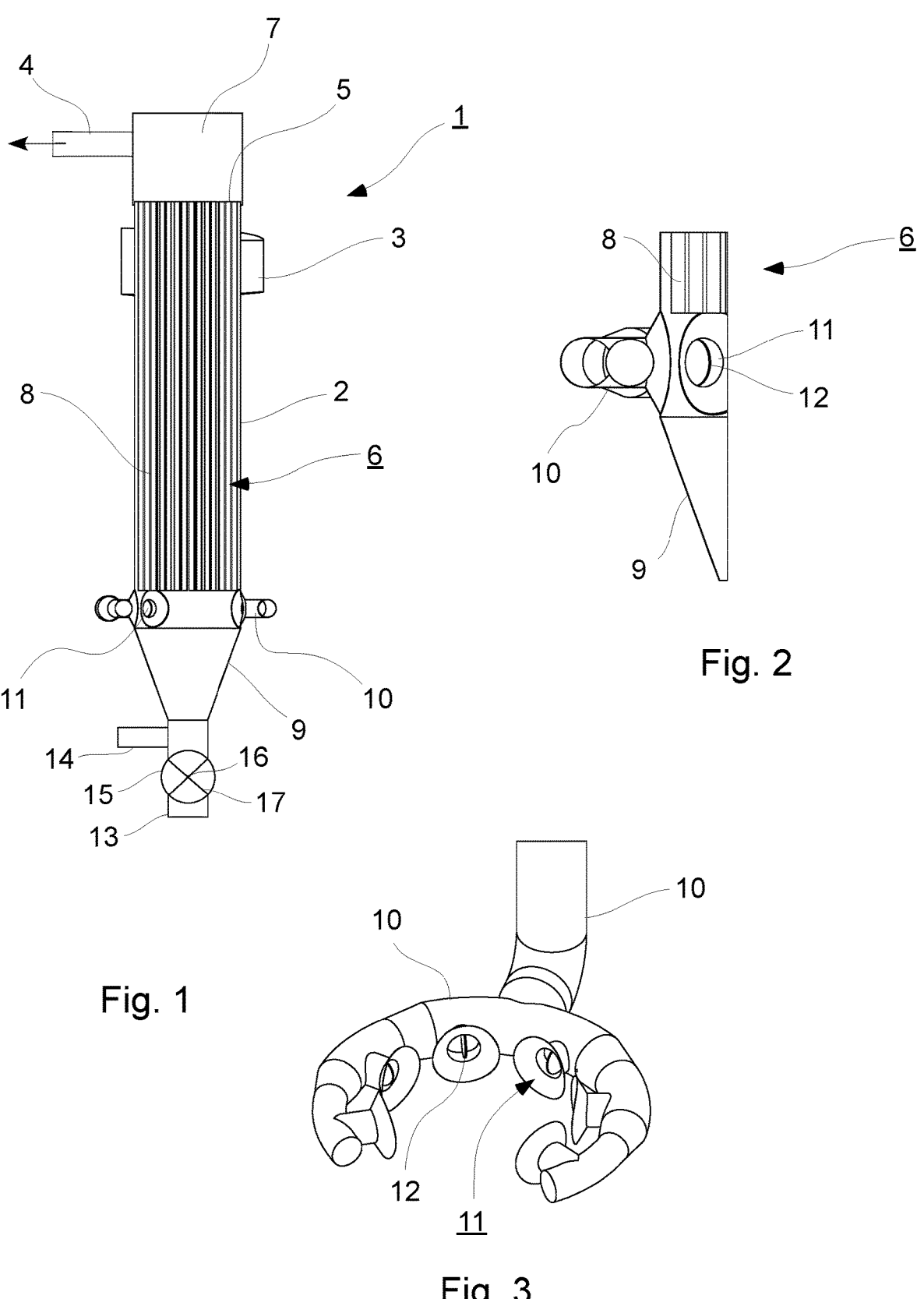
FIG. 1 shows a cut through an embodiment of a filter system in accordance with the present invention, where a number of inlets or supplies for drying air or gas is placed at a lower part of the filter housing and shown with a product discharge outlet.
FIG. 2 shows a section of the filter system of FIG. 1.
FIG. 3 shows an inlet or supply for drying air or gas for the filter system of FIG. 1.
Figures 4, 5:
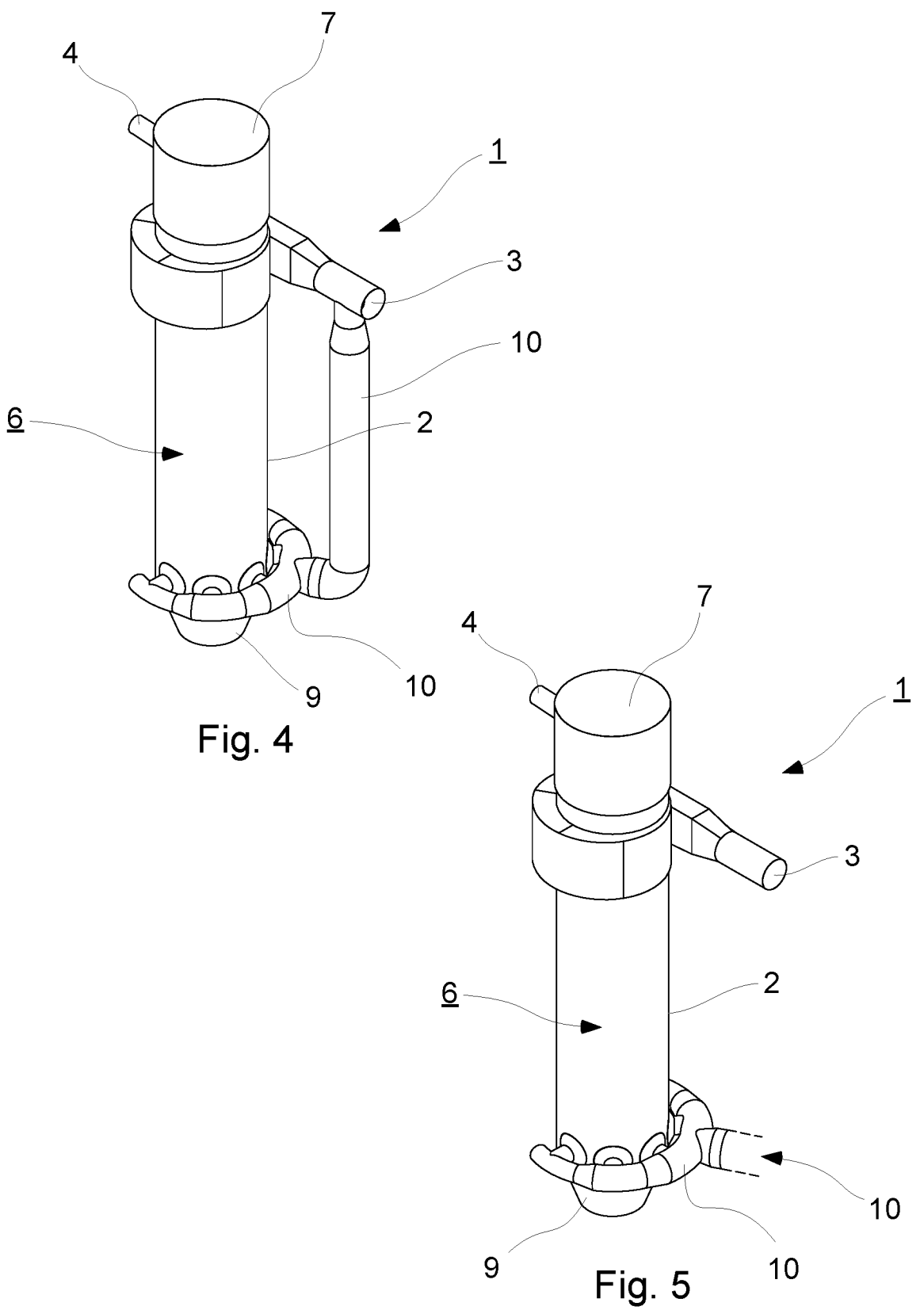
FIG. 4 shows an outside view of the filter system of FIG. 1, but not showing the product discharge outlet.
FIG. 5 shows a second embodiment of a filter system with an alternative supply of drying air or gas in accordance with the present invention.
Figures 6, 7:
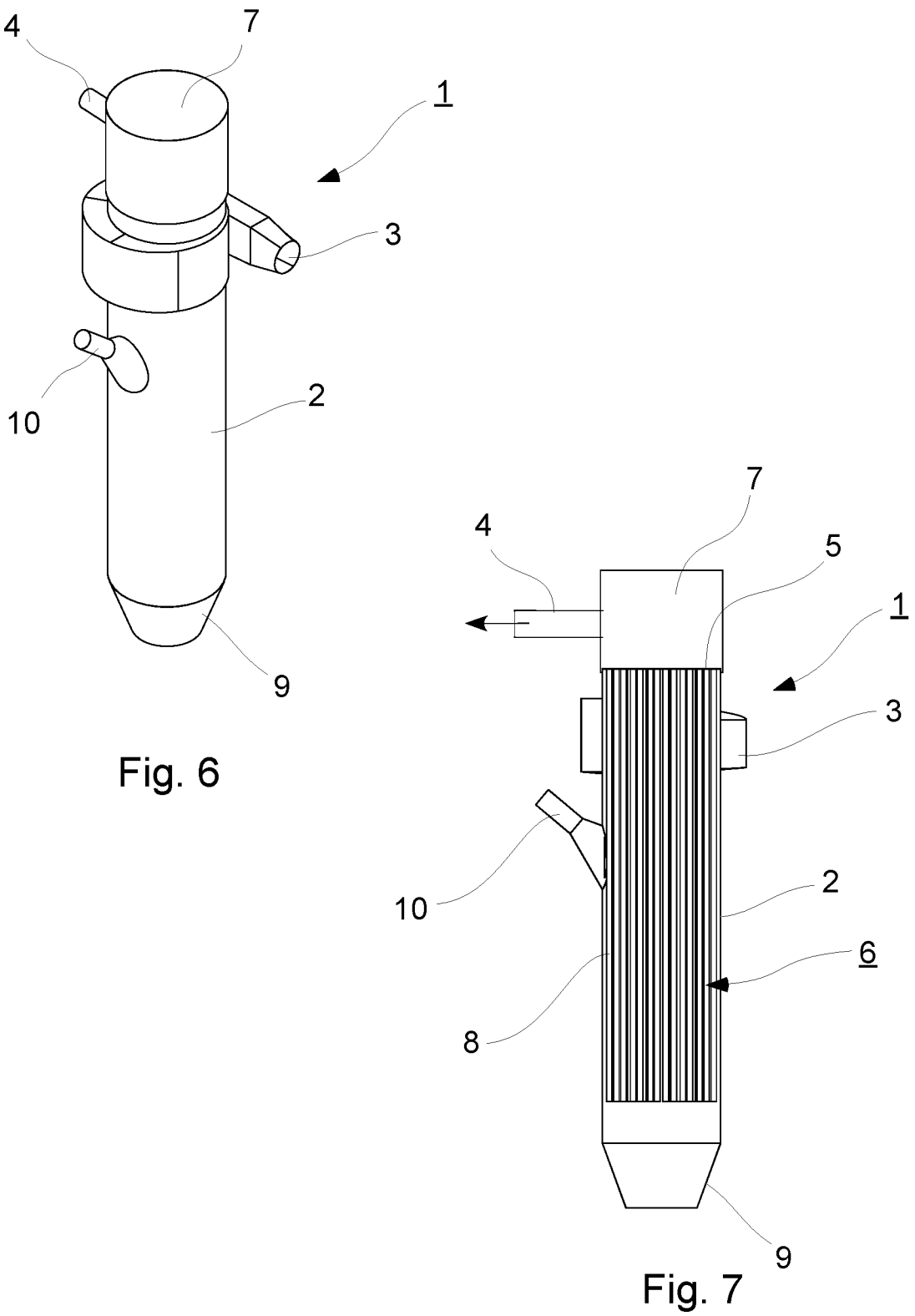
FIG. 6 shows a third embodiment of a filter system with an inlet or supply for drying air or gas placed in an upper part of the filter housing in accordance with the present invention.
FIG. 7 shows a cut through of the filter system shown in FIG. 6.
Figures 8, 9:
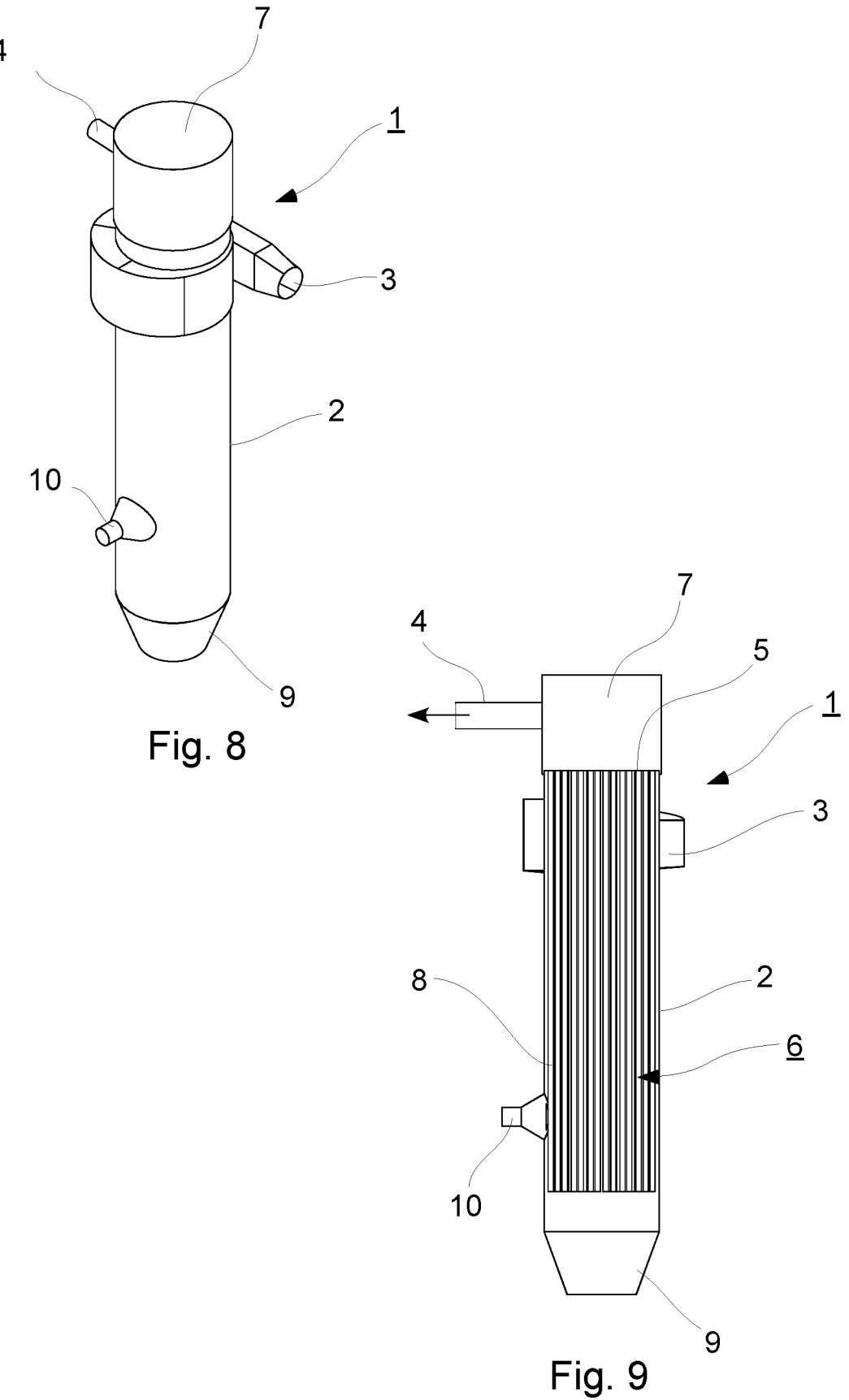
FIG. 8 shows a fourth embodiment of a filter system with an inlet or supply for drying air or gas placed in a lower part of the filter housing in accordance with the present invention.
FIG. 9 shows a cut through of the filter system shown in FIG. 8.
Figures 10, 11:
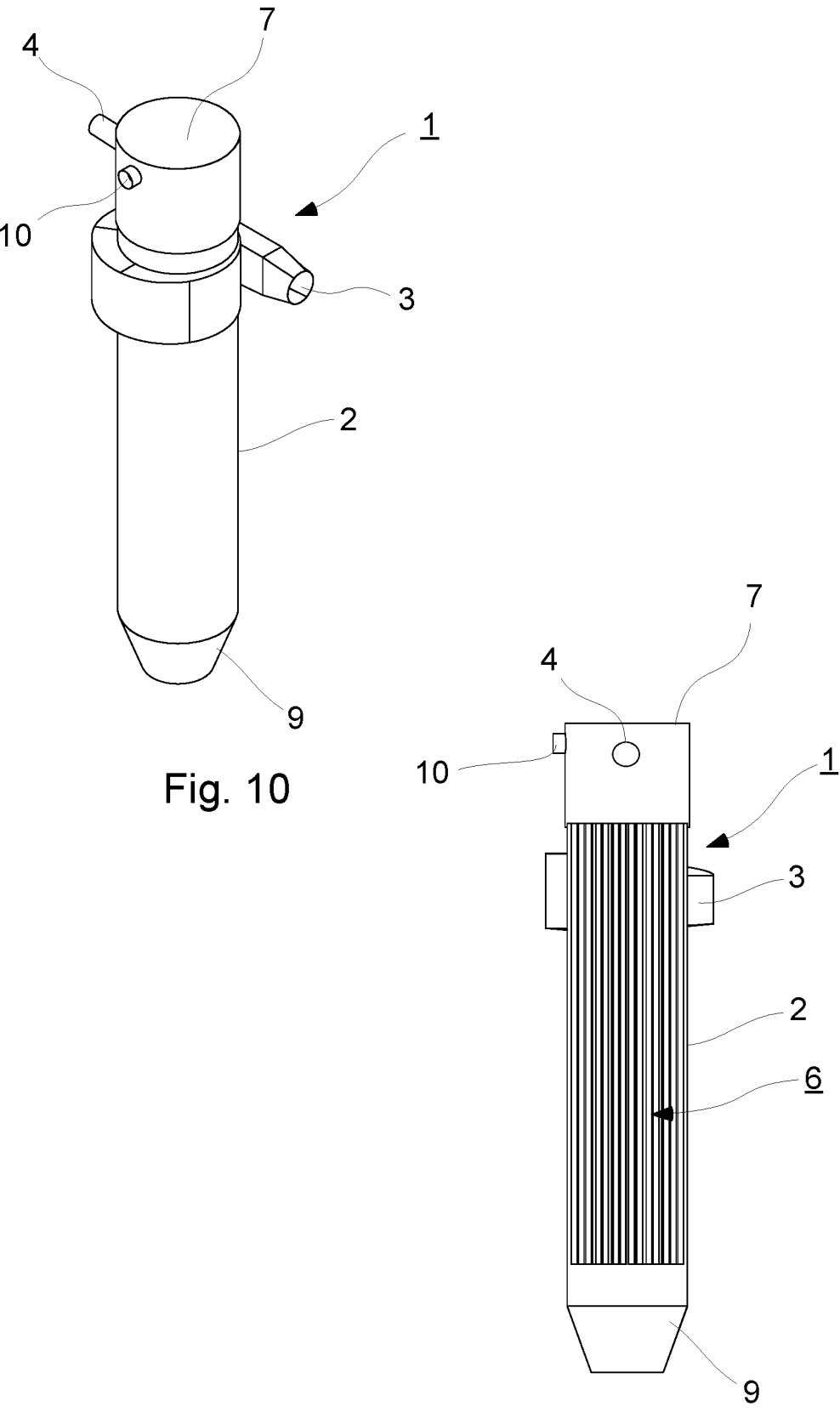
FIG. 10 shows a fifth embodiment of a filter system with an inlet or supply for drying air or gas passed through a clean-gas chamber of the filter system in accordance with the present invention.
FIG. 11 shows a cut through of the filter system shown in FIG. 10.
Figure 12:
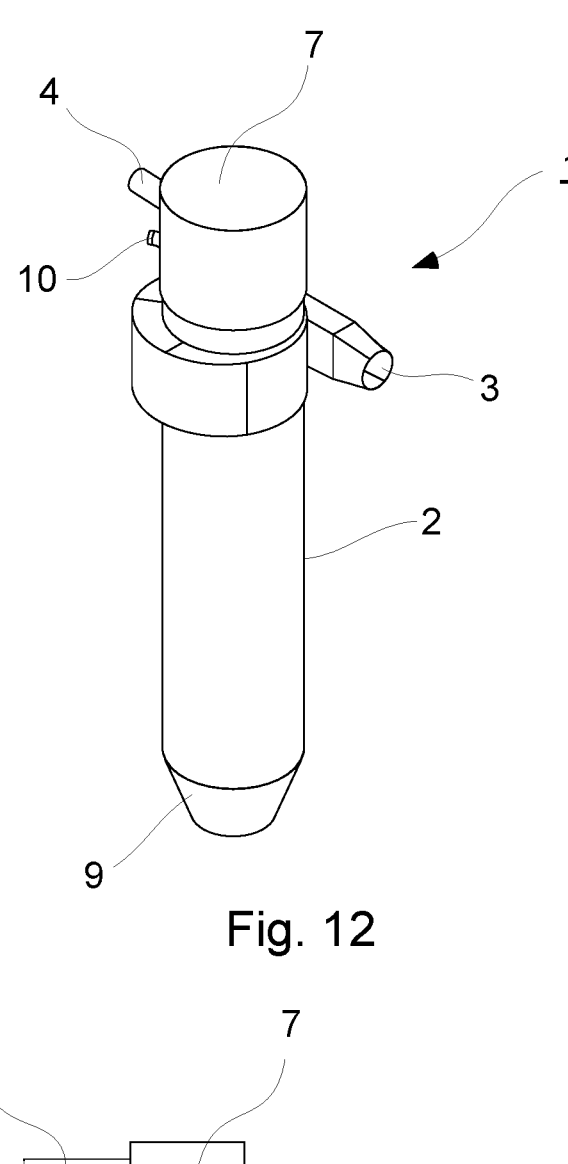
FIG. 12 shows a sixth embodiment of a filter system with an inlet or supply for drying air or gas passed through the clean-gas chamber of the filter system in accordance with the present invention.
Figure 13:
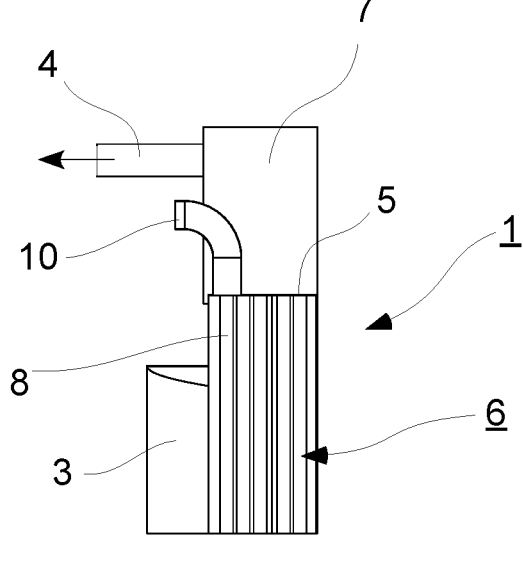
FIG. 13 shows a cut through of the filter system shown in FIG. 12.
Figure 14:
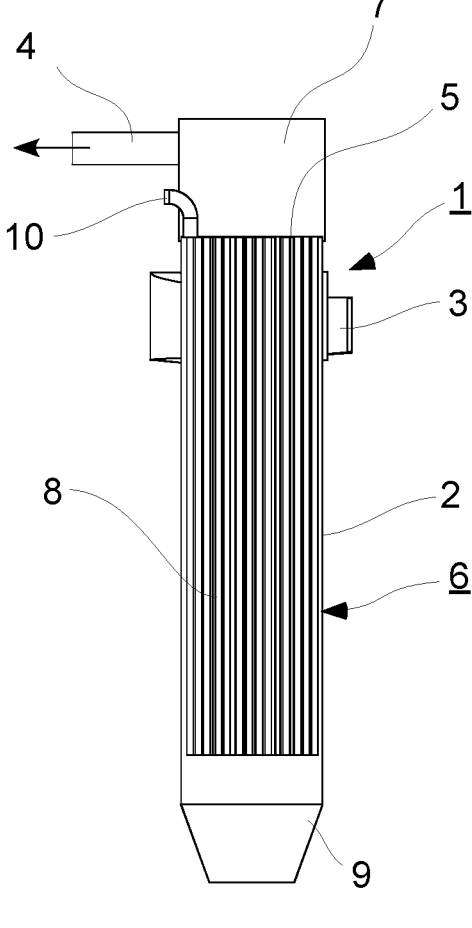
FIG. 14 shows a section of the filter system with an inlet or supply for drying air or gas of FIG. 13.

Various embodiments are described hereinafter with reference to the figures. Like reference numerals refer to like elements throughout. Like elements will, thus, not be described in detail with respect to the description of each figure.

It should also be noted that the figures are only intended to facilitate the description of the embodiments.

They are not intended as an exhaustive description of the invention or as a limitation on the scope of the invention. In addition, an illustrated embodiment needs not have all the aspects or advantages shown.

An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

According to the invention, a filter system 1 includes a filter housing 2 with an inlet part 3 and a clean-gas outlet 4. The filter system 1 further includes a partition wall 5 dividing the filter housing 2 into a product chamber 6 and a clean-gas chamber 7, the partition wall 5 being provided with a number of openings from which a plurality of filter elements 8 extends downwards into the product chamber 6, which inlet part 3 is placed in an upper part of the product chamber 6 and in open communication with the product chamber 6, and configured for supplying a product-containing flow of gas to the product chamber 6, the gas flow being conveyed through the filter elements 8 and upwards into the clean-gas chamber 7, from where the filtered gas is discharged through the clean-gas outlet 4.

The partition wall 5 is most often an apertured plate or tube sheet, which divides the filter housing into a gas-cleaning chamber or product chamber 6 and a clean-gas take-off chamber or plenum 7. The partition wall 5 supports a plurality of tubular filter elements 8 within the product chamber 6, so when a product-containing gas is directed through the inlet 3 into the product chamber 6, the gas passes through the filter elements 8 and leave the filter housing 2 through the clean-gas chamber 7 and the clean-gas outlet 4. Particulate materials separated from the product-containing gases are deposited on the exterior of each filter element 8 and are afterwards lead out through a discharge outlet 13 at the bottom 9 of the filter housing 2, which is well known in the art. To accommodate cleaning of the filter elements 8, the filter housing 2 (or bag house in case bag filters are used) includes a reverse-flow flushing arrangement, pulse cleaning, a filter element shaking system or the like (not shown). Further, when the filter system 1 is stopped due to wet cleaning, the filter elements 8 are cleaned with liquid, which liquid is to be dried before the filter system 1 can enter operational mode again.

The product discharge outlet 13 is connected to the bottom 9 of the filter housing 2 and the outlet 13 can be provided with a valve 17 in a valve housing 15, which valve 17 can rotate in the housing 15 around an axle 16 in order to open and close the valve 17. When the valve 17 is open, product from the filter housing can be removed and after wet cleaning of the filter elements 8, liquid can be removed through the valve. Between the discharge outlet and the filter housing, an air or gas inlet 14 for drying air or gas can be placed. The valve 17 in this embodiment is configured as a rotor shown in FIG. 1 with four wings or vanes, forming four cells within the housing 15. Hereby is obtained that the valve or rotor 17 can be turned for discharging product through the outlet 13 as a kind of airlock without opening for free passage of air through the lock. In other embodiments, the valve or rotor can be provided with six, eight or ten wings or vanes forming the same number of cells in the rotor 17. If drying air or gas is to be injected into the filter system 1 through the discharge outlet 13 in this embodiment, the valve or rotor 17 must be removed first. The valve or rotor 17 can have any number of wings or vanes, as long as it is able to function as an airlock.

In an embodiment (not shown) two or more valves can be placed in series one above the other in the discharge outlet 13. Hereby it is possible to close the lower valve and open the upper valve. Then product powder will enter a space between the two valves. Now the upper valve can be closed and the lower valve opened, and product is thereby discharged from the filter. This sequence can be repeated discharging product from the filter housing without need for pausing the filtering process.

The valves 17 can be butterfly valves, flap valves or similar valves. When more than one valve 17 are used, both or all valves are open, when injecting drying air or gas through the valves 17 in the product discharge opening 13.

In an embodiment the drying air or gas inlet 14 and/or an air or gas inlet through the product discharge outlet 13, can be used as an additional drying air or gas supply.

Here an additional drying air or gas inlet 14 and/or an air or gas inlet through a product discharge outlet 13 supplies an additional drying air or gas to the filter system 1.

In an alternative embodiment, one or more drying air or gas supplies 10 are replaced by an additional drying air or gas supply 14 connected to a bottom 9 of the filter housing 2.

In an alternative embodiment, one or more drying air or gas supplies 10 are replaced by an additional drying air or gas supply supplied through a product discharge outlet 13 connected to a bottom 9 of the filter housing 2.

In these embodiments the drying air or gas inlet 14 and/or an air or gas inlet through the product discharge outlet 13, can be used as main supply of drying air or gas and even as the only drying air or gas supplies.

Hereby the drying air or gas supply 14 and/or a drying air or gas supply through the product discharge outlet 13 replaces the drying air or gas supplies 10 connected to the filter inlet 3 or to the filter housing 2.

This is illustrated in FIG. 1 showing also the air or gas supplies 10, but these embodiments can also be carried out without the drying air or gas supplies 10 as well as being added to the rest of the embodiments shown in the rest of the figures.

It is clear that if drying air or gas is supplied through the product discharge outlet 13, the valve or valves 17 must be open.

To be able to minimize the down time for the filter system 1 after wet cleaning, the filter system 1 is provided with one or more air or gas supplies 10 placed in the product chamber 6 below the inlet part 3 and configured for leading drying air or gas into or out of the filter system 1.

Down time for the filter system 1 can be explained as the time from stopping the filter system 1 and until the filter elements 8 are dried. Only the drying time of the down time can be shortened by this invention.

Drying air or gas should be understood as drying air or drying gas.

In an embodiment, the one or more drying air or gas supplies 10 is placed in a lower part of the filter housing 2 and having openings 11 placed below the filter elements 8. Placing the one or more drying air or gas supplies 10 in a lower part of the filter housing 2 and the drying air or gas supplies 10 having openings 11 placed below the filter elements 8 ensures a flow of drying air or gas from below and up along sides of the filter elements 8, optimizing the drying process.

In an embodiment, the one or more drying air or gas supplies 10 is placed in a lower part of the filter housing 2 and having openings 11 placed at a level corresponding to a lower part of the filter elements 8. Hereby is also ensured that drying air or gas is supplied along or along most of a length of the filter elements 8.

In an alternative embodiment, the one or more drying air or gas supplies is connected to the bottom 9 of the filter housing 2 or to the discharge outlet for removing product.

In an embodiment, the one or more drying air or gas supplies 10 is placed in an upper part of the filter housing 2 and having openings 11 directing drying air or gas towards the lower part of the filter elements 8. Hereby the drying air or gas is entered into the filter housing 2 in a direction different from a perpendicular direction in relation to the filter elements 8 giving a flow of drying air or gas within the filer being substantially in a lengthwise direction in relation to the filter elements 8 giving a circulation of drying air or gas from the upper part of the filter housing 2 in a downwards direction towards the lower part of the filter housing 2 along the filter elements 8.

In an embodiment the air or gas supplies 10 directs the drying air or gas in a downwards angle towards the lower part of the filter elements 8.

In an alternative embodiment, the drying air or gas is directed towards the filter elements 8 by use of baffles, guide elements or the like (not shown).

In an embodiment the one or more drying air or gas supplies 10 is connected to the filter inlet 3 passing drying air or gas through the filter inlet 3 and through one or more drying air or gas supplies 10.

In an embodiment, the drying air or gas can also be supplied through the clean-gas outlet tube 4 to pass drying air or gas into the filter system 1 in a reverse direction (not shown) compared to normal operation.

In an alternative embodiment, the drying air or gas supplies 10 can be connected directly to the clean gas outlet tube 4.

These embodiments provides for supply of drying air or gas in a flow from the upper part of the filter elements 8 and downwards along the filter elements 8.

In an embodiment one or more drying air or gas supplies 10 is placed as a combination of one or more placements mentioned in one or more of the above embodiments, leaving a possibility for supplying and/or extracting or leading out drying air or gas from the filter housing 2 from different or several connection points.

In an embodiment the one or more drying air or gas supplies 10 is connected to the filter inlet 3 and/or the clean-gas outlet 4 and/or discharge outlet for removing product (not shown), the one or more drying air or gas supplies 10 being closed by a closer or closing means 12 during normal operation and open during drying of the filter elements 8. Here it is possible to make use of existing piping in the filter system 1 the supply or extract drying air or gas from the filter housing 2. The closer or closing means 12 can be butterfly valves, flap valves or similar closer or closing means 12.

In an embodiment, the drying air or gas is passed into the filter system 1 through the clean-gas chamber 7 and out of the filter system 1 through the one or more drying air or gas supplies 10. Hereby a reverse flow in the filter system is obtained as an option of supply of drying air or gas. This is a situation as opposed to normal operation of the filter system. Hereby the filter elements 8 are dried by blowing drying air or gas from inside the filter elements 8.

In an alternative embodiment, drying air or gas can provided through the filter inlet 3 using the drying air or gas supplies 10 as outlets for the drying air or gas.

To dry the filter elements 8 of a filter system 1 method is provided, where drying air or gas is supplied to the filter elements 8 after wet cleaning of the filter elements 8, by passing drying air or gas through the filter inlet 3 and/or through one or more drying air or gas supplies 10.

In an embodiment of the method, drying air or gas is passed into the filter 1 through the filter inlet 3 and at least a part of the drying air or gas is directed out of the filter 1 through the one or more drying air or gas supplies 10.

The person skilled in the art realizes that the present disclosure is not limited to the preferred embodiments described above. The person skilled in the art further realizes that modifications and variations are possible within the scope of the invention. Additionally, variations to the disclosed embodiments can be understood and effected by the skilled person in practicing the disclosure, from a study of the drawings, and the disclosure.

The invention claimed is:

1. A filter system, comprising:
a filter housing comprising:
an inlet for a product-containing gas, for the product-containing gas to be cleaned by filtering in a product-containing gas cleaning mode of the filter system;
an outlet for cleaned gas; and
a partition wall dividing the filter housing into a product chamber for the product-containing gas and a clean-gas chamber, wherein the partition wall is provided with a number of openings from which a plurality of filter bags extend downwards into the product chamber;
wherein the inlet is placed in an upper part of the product chamber and in open communication with the product chamber, and configured for supplying the product-containing gas to the product chamber in the product-containing gas cleaning mode, wherein cleaning of the product-containing gas is accomplished by the product-containing gas flowing into insides of the plurality of filter bags and filtered gas from the plurality of filter bags flows upwards into the clean-gas chamber, from where the filtered gas is discharged through the outlet as clean gas;
a source of drying air or gas;
one or more drying air or gas supplies connected to the source of drying air or gas and having openings placed below the plurality of filter bags in a part of the product chamber and are configured for leading drying air or gas from below and up along sides of the plurality of filter bags after a wet cleaning mode of the filter system, wherein during the wet cleaning mode and prior to the filter system entering the product-containing gas cleaning mode, the plurality of filter bags are wet cleaned; and
wherein the drying air or gas is for drying the plurality of filter bags.

2. The filter system according to claim 1, wherein the one or more additional drying air or gas supplies of the drying air or gas are placed at a level corresponding to a lower part of the plurality of filter bags.

3. The filter system according to claim 1, wherein the openings of the one or more drying air or gas supplies are placed around the lower part of the product chamber.

4. The filter system according to claim 1, wherein one or more of the one or more drying air or gas supplies is connected to the inlet.

5. The filter system according to claim 1, wherein one or more of the one or more drying air or gas supplies are closed by a closer during the product-containing gas cleaning mode and are opened after the wet cleaning mode.

6. The filter system according to claim 1, wherein an additional supply of the drying air or gas is configured to supply drying air or gas to the lower part of the product chamber through a discharge outlet for the product chamber.

7. The filter system according to claim 1, wherein an additional supply of the drying air or gas is configured to supply drying air or gas at a bottom of the filter housing.

8. The filter system according to claim 1, wherein the inlet is at a height that corresponds to a portion of the plurality of filter bags.

9. A method of drying a plurality of filter elements in a filter system, wherein the filter system comprises:
a filter housing comprising:
an inlet for a product-containing gas, for the product-containing gas to be cleaned by filtering in a product-containing gas cleaning mode of the filter system;
an outlet for cleaned gas; and
a partition wall dividing the filter housing into a product chamber for the product-containing gas and a clean-gas chamber, wherein the partition wall is provided with a number of openings from which a plurality of filter bags extend downwards into the product chamber;
wherein the inlet for the product-containing gas is placed in an upper part of the product chamber and in open communication with the product chamber, and configured for supplying the product-containing gas to the product chamber in the product-containing gas cleaning mode, wherein cleaning of the product-containing gas is accomplished by the product-containing gas flowing into insides of the plurality of filter bags and filtered gas from the plurality of filter bags flows upwards into the clean-gas chamber, from where the filtered gas is discharged through the outlet for clean gas;

a source of a drying air or gas;

one or more drying air or gas supplies connected to the source of drying air or gas and having openings placed in a part of the product chamber below the plurality of filter bags;

the method comprising:

leading the drying air or gas from the source and the openings from below and up along sides of the plurality of filter bags;

supplying the drying air or gas from the source of the drying air or gas to the one or more drying or gas supplies after wet cleaning of the plurality of filter bags and before the filter system enters the product-containing gas cleaning mode; and applying the drying air or gas to the plurality of filter bags so as to dry the plurality of filter bags.

10. A filter system, comprising:

a filter housing comprising:

an inlet for a product-containing gas, for the product-containing gas to be cleaned by filtering in a product-containing gas cleaning mode of the filter system;

an outlet for cleaned gas; and a partition wall dividing the filter housing into a product chamber for the product-containing gas and a clean-gas chamber, wherein the partition wall is provided with a number of openings from which a plurality of filter bags extend downwards into the product chamber;

wherein the inlet for the product-containing gas is placed in an upper part of the product chamber and in open communication with the product chamber, and configured for supplying the product-containing gas to the product chamber in the product-containing gas cleaning mode, wherein cleaning of the product-containing gas is accomplished by the product-containing gas flowing into insides of the plurality of filter bags and filtered gas from the plurality of filter bags flows upwards into the clean-gas chamber, from where the filtered gas is discharged through the outlet for clean gas;

a source of a drying air or gas;

one or more drying air or gas supplies having openings placed in an upper part of the product chamber and are configured for leading drying air or gas towards a lower part of the plurality of filter bags after a wet cleaning mode of the filter system, wherein during the wet cleaning mode and prior to the filter system entering the product-containing gas cleaning mode, the plurality of filter bags are wet cleaned; and wherein the drying air or gas is for drying the plurality of filter bags.

* * * * *